US012177029B1

(12) United States Patent
Munnangi et al.

(10) Patent No.: US 12,177,029 B1
(45) Date of Patent: Dec. 24, 2024

(54) SYSTEM FOR TESTING AND VERIFICATION OF SERIAL COMMUNICATION PROTOCOLS

(71) Applicant: SILICONCH SYSTEMS PVT LTD, Karnataka (IN)

(72) Inventors: Sirisha Munnangi, Andhra Pradesh (IN); Kaustubh Kumar, Uttar Pradesh (IN); Ranjith Siddalinga, Karnataka (IN)

(73) Assignee: SILICONCH SYSTEMS PVT LTD, Karnataka (IN)

( * ) Notice: Subject to any disclaimer, the term of this patent is extended or adjusted under 35 U.S.C. 154(b) by 0 days.

(21) Appl. No.: 18/513,300

(22) Filed: Nov. 17, 2023

(30) Foreign Application Priority Data

Jun. 14, 2023 (IN) .............................. 202341040439

(51) Int. Cl.
*H04L 1/00* (2006.01)
*H04L 1/22* (2006.01)
*H04L 1/24* (2006.01)

(52) U.S. Cl.
CPC ................ *H04L 1/244* (2013.01); *H04L 1/22* (2013.01)

(58) Field of Classification Search
None
See application file for complete search history.

(56) References Cited

U.S. PATENT DOCUMENTS

| 7,672,803 | B1 * | 3/2010 | Lee | ........................ | G11C 29/44 |
| | | | | | 702/117 |
| 9,836,372 | B1 * | 12/2017 | Khan | .................. | G06F 11/3604 |
| 11,018,964 | B2 * | 5/2021 | Kelly | ...................... | H04L 43/08 |
| 2009/0282307 | A1 * | 11/2009 | Chaturvedula | ............................. | |
| | | | | | G01R 31/318314 |
| | | | | | 714/E11.155 |
| 2016/0014004 | A1 * | 1/2016 | Bergeron | .............. | H04L 47/196 |
| | | | | | 709/224 |
| 2017/0147461 | A1 * | 5/2017 | Carmichael | ......... | G06F 11/2733 |
| 2020/0033409 | A1 * | 1/2020 | Hobbs | .............. | G11C 29/56016 |
| 2020/0204447 | A1 * | 6/2020 | Chow | ................ | G06F 13/4221 |
| 2021/0286694 | A1 * | 9/2021 | King | ...................... | G06F 11/27 |

OTHER PUBLICATIONS

Universal Serial Bus Type-C Cable and Connector Specification Release 2.0, USB 3.0 Promoter Group, Aug. 2019 (373 pages).
Universal Serial Bus Power Delivery Specification, Revision 3.0, Version 2.0, Aug. 29, 2019 (657 pages).

* cited by examiner

*Primary Examiner* — Mujtaba M Chaudry
(74) *Attorney, Agent, or Firm* — Procopio, Cory, Hargreaves & Savitch LLP

(57) ABSTRACT

A system is provided including an adaptive scoreboard for testing and verification of serial communication protocols. The scoreboard is configured to: receive, through a first port, actual data packets from a design under test (DUT), and, through a first pattern detection engine, based on a set of pre-defined skip patterns, identify a first set of redundant data packets from the actual data packets; receive, through a second port, reference data packets from a reference model, and, through a second pattern detection engine, based on the set of pre-defined skip patterns, identify a second set of redundant data packets from the reference data packets; and compare the actual data packets and reference data packets to verify the functionality of the DUT by at least one of ignoring the first and second sets of redundant data packets and comparing the first and second sets of redundant data packets if they are matching.

17 Claims, 3 Drawing Sheets

SYSTEM FOR TESTING AND VERIFICATION OF SERIAL COMMUNICATION PROTOCOLS

CROSS REFERENCE TO RELATED APPLICATIONS

The present application is based on and claims priority from Indian patent application No. 202341040439, filed on Jun. 14, 2023, the entire content of which is incorporated herein by reference.

TECHNICAL FIELD

The present disclosure relates generally to testing and verification of serial communication protocols. In particular, the present disclosure relates to an adaptive scoreboard for testing and verification of serial communication protocols.

BACKGROUND

Background description includes information that can be useful in understanding the present invention. It is not an admission that any of the information provided herein is prior art or relevant to the presently claimed invention, or that any publication specifically or implicitly referenced is prior art.

A scoreboard is a component which receives data packets or transactions from a design under test (DUT) and from a reference model and verifies the functionality of the DUT by comparing the transactions from DUT with the transaction from the reference model.

Generally, conventional scoreboards compare the data packets from DUT and reference model and report errors if there are mismatches between them at any point of time. However, for certain serial protocols, sometimes due to any one or a combination of time skew between DUT and reference model operations, and due to redundant functionality implemented in the DUT and the reference model, some extra redundant packets may be sent from either DUT or reference model, which can be identified and ignored from comparison instead of reporting them as errors.

There is, therefore, a requirement in the art for an improved means to compare data packets sent by DUT and the reference model.

OBJECTS OF INVENTION

An object of the present invention is to provide a system for identifying and ignoring valid redundant transactions sent from DUT and reference model due to time skew between them.

Another object of the present invention is to provide a system where a set of valid redundant transactions that can be skipped from comparison is configurable.

Another object of the present invention is to provide a system where events and timestamps of the corresponding skip patterns with respect to which skip patterns can be identified and ignored from comparison are configurable.

Another object of the present disclosure is to provide a system where skip pattern counts, which specify a number of times a skip pattern can be ignored from comparison after the occurrence of the corresponding event/timestamp is configurable.

Another object of the present invention is to provide a system that adjusts in real-time by identifying one or more additional error data packets occurring on either or both of the DUT and the reference model by performing a slide and compare, and removing the identified additional error data packets from the comparison.

SUMMARY

In an aspect, the present disclosure provides a system including a scoreboard operatively coupled to a processor, for testing and verification of serial protocol systems. The scoreboard is configured to receive, through a first port, actual data packets from a design under test (DUT), and, through a first pattern detection engine, based on a set of pre-defined skip patterns, identify a first set of redundant data packets from the received actual data packets. The scoreboard is further configured to receive, through a second port, reference data packets from a reference model, and, through a second pattern detection engine, based on the set of pre-defined skip patterns, identify a second set of redundant data packets from the received reference data packets. The scoreboard is further configured to compare the received actual data packets and received reference data packets to verify the functionality of the DUT by at least one of ignoring the first and second sets of redundant data packets and comparing the first and second sets of redundant data packets if they are matching.

In some embodiments, the first and second sets of redundant data packets are transmitted owing to any one or a combination of time skew between operations of the DUT and the reference model, and redundant functionality implemented in the DUT and the reference model.

In some embodiments, the first and second sets of redundant data packets are identified based on a specified event, specified timestamp, and the corresponding first and second set of pre-defined skip patterns. In some embodiments, the scoreboard ignores the first and second sets of redundant data packets from the comparison for a specified skip pattern count after occurrence of the specified event and/or timestamp.

In some embodiments, one or more predefined skip patterns from the set of pre-defined skip patterns is associated with a wait event after which the corresponding skip pattern is skipped from the comparison.

In some embodiments, the one or more predefined skip patterns from the set of pre-defined skip patterns are associated with a time during which the respective skip pattern is skipped from the comparison after occurrence of the wait event.

In some embodiments, the pre-defined skip patterns are a sequence of data packets/transactions arranged in a defined order.

In some embodiments, the set of pre-defined skip patterns are prioritized in a manner such that highest priority skip pattern that matches the received actual data packets is set as the priority pattern.

In some embodiments, the first and second pattern detection engines are same.

In some embodiments, the actual data packets and the reference data packets are positioned respectively in first and second first-in-first-out (FIFOs), wherein the first and second sets of redundant data packets are labelled by the respective first and second pattern detection engines such that the labelled data packets are any one of compared, ignored, and kept on hold during the comparison. Further, the labelled data packets are any one of compared, ignored, and kept on hold during the comparison until pattern matching is completed in the first and second pattern detection engines.

In some embodiments, the first and second sets of redundant data packets are labelled with a skip marker field.

In some embodiments, the comparison between the received actual data packets and received reference data packets is undertaken when the corresponding first and second FIFOs reach a minimum threshold size, said minimum threshold size being dynamically controlled based on lengths of skip patterns being matched with the received actual data packets and the received reference data packets at the first and second ports respectively, and priority associated therewith.

In some embodiments, comparison between the received actual data packets and received reference data packets is undertaken using comparison FIFOs that don't include the first and second sets of redundant data packets.

In some embodiments, transaction ID of any one or both of the received actual data packets and the received reference data packets are adjusted based on a number of respective first and second sets of redundant data packets ignored from the comparison.

In some embodiments, the scoreboard self-adjusts by, in real-time, during the comparison between the received actual data packets and received reference data packets, identifying one or more additional error data packets occurring on either or both of the DUT and the reference model by performing a slide and compare, and removing the identified additional error data packets from the comparison.

In some embodiments, the first and second FIFOs are flushed upon receipt of a global reset event.

In some embodiments, any or both of the first and second ports are implemented as transaction level modeling (TLM) ports defined in a universal verification methodology (UVM).

Various objects, features, aspects, and advantages of the inventive subject matter will become more apparent from the following detailed description of preferred embodiments, along with the accompanying drawing figures in which like numerals represent like components.

BRIEF DESCRIPTION OF DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

The diagrams are for illustration only, which thus is not a limitation of the present disclosure, and wherein.

DETAILED DESCRIPTION

In the following description, numerous specific details are set forth in order to provide a thorough understanding of embodiments of the present invention. It will be apparent to one skilled in the art that embodiments of the present invention may be practiced without some of these specific details.

The present disclosure relates generally to testing and verification of communications protocol. In particular, the present disclosure relates to a scoreboard for testing and verification of serial communications protocol.

Figure 1:
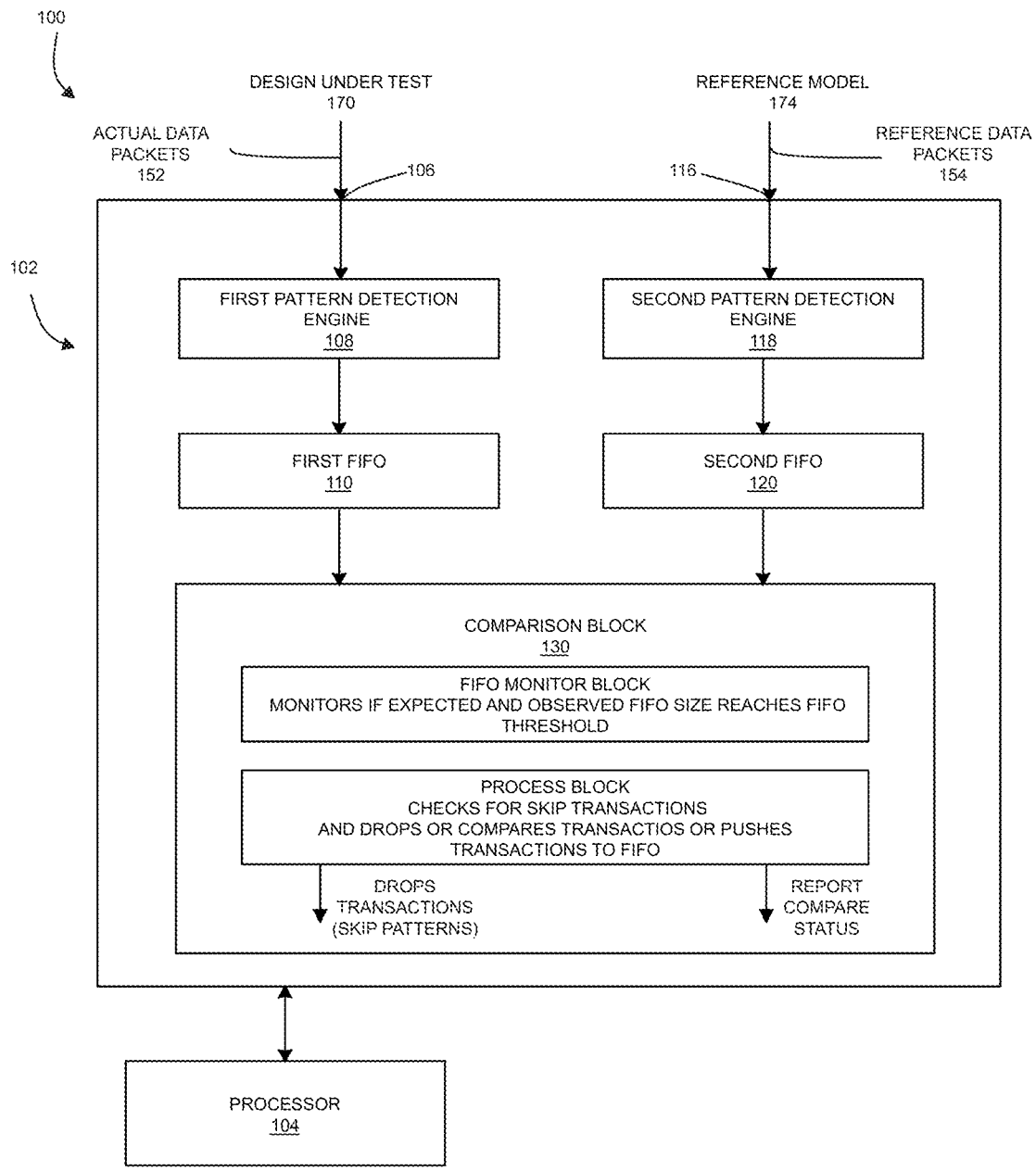
FIG. 1 illustrates a schematic block diagram of an adaptive scoreboarding system for testing and verification of serial communication protocols, according to an embodiment of the present disclosure.

FIG. 1 illustrates a schematic block diagram of a system 100 for testing and verification of serial communication protocols, according to an embodiment of the present disclosure. The system 100 includes a scoreboard 102 operatively coupled to a processor 104, for testing and verification of serial protocol systems. The scoreboard further includes a first port 106. The scoreboard 102 is configured to receive, through the first port 106, actual data packets 152 from a design under test (DUT) 170. The scoreboard 102 further includes a first pattern detection engine 108. The scoreboard 102 is configured to, through the first pattern detection engine 108, based on a set of predefined skip patterns, identify a first set of redundant data packets from the received actual data packets 152.

Skip patterns may be a set of transactions that may be considered to be skipped from comparison. In some embodiments, the predefined skip patterns are a sequence of data packets arranged in a defined order. In some embodiments, the set of predefined skip patterns are prioritized in a manner such that a highest priority skip patterns that matches the received actual data packets 152 is set as the priority pattern.

The scoreboard 102 further includes a second port 116. The scoreboard 102 is configured to receive, through the second port 116, reference data packets 154 from a reference model 174. The scoreboard 102 further includes a second pattern detection engine 118. The scoreboard 102 is configured to, through the second pattern detection engine 118, based on the set of predefined skip patterns, identify a second set of redundant data packets from the received reference data packets 154.

The scoreboard 102 further includes a comparison block 130. The scoreboard 102 is configured to compare, through the comparison block 130, the received actual data packets 152 and the received reference data packets 154 to verify the functionality of the DUT by at least one of ignoring the first and second sets of redundant data packets, and comparing the first and second set of redundant data packets if they are matching.

In some embodiments, any or both of the first and second ports 106, 116 are implemented as transaction level modelling (TLM) ports defined in a universal verification methodology (UVM).

In some embodiments, the first and second pattern detection engines 108, 118 are the same.

In some embodiments, the first and second sets of redundant data packets are transmitted owing to one or both of a time skew between operations of the DUT 170 and the reference model 174, and redundant implementations in the DUT 170 and the reference model 174.

In some embodiments, the first and second sets of redundant data packets are identified based on a specified event, specified timestamp, and the set of pre-defined skip patterns. In some embodiments, the scoreboard 102 is configured to ignore the first and second sets of data packets from the comparison for a specified skip pattern count after occurrence of the specified event and/or the timestamp.

In some embodiments, one or more predefined skip patterns from the set of predefined skip patterns is associated with a wait event, after which the skip pattern is skipped from the comparison. In some embodiments, the one or more predefined skip patterns from the set of predefined skip patterns is associated with a time during which the skip patterns are skipped from the comparison after the occurrence of the wait event.

In some embodiments, the received actual data packets 152 and the received reference data packets 154 are positioned respectively in a first and second first-in-first-out (FIFOs) 110, 120. The first and second sets of redundant data packets are labelled by the respective first and second pattern detection engines 108, 118, such that the labelled data packets are any one of compared, ignored, and kept on hold during the comparison.

In some embodiments, the first and second sets of redundant data packets are labelled with a skip marker field.

In some embodiments, the comparison between the received actual data packets 152 and the received reference data packets 154 is undertaken when the corresponding first and second FIFOs 110, 120 reach a minimum threshold size. The minimum threshold size is dynamically controlled based on the lengths of skip patterns being matched with the received actual data packets 152 and the received reference data packets 154 at the first and second ports 106, 116 respectively, and priority associated therewith.

In some embodiments, the comparison between the received actual data packets 152 and the received reference data packets 154 is undertaken using comparison FIFOs that do not include the first and second sets of redundant data packets.

In some embodiments, the scoreboard 102 is configured to self-adjust in real time, during the comparison between the received actual data packets 152 and the received reference data packets 154, by identifying one or more additional error data packets occurring on either or both of the DUT 170 and the reference model 174 by performing a slide and compare, and removing and reporting the identified additional error data packets from the comparison.

In some embodiments, a transaction ID of any one or both of the received actual data packets 152 and the received reference data packets 154 is adjusted based on a number of respective first and second sets of redundant data packets ignored from the comparison.

In some embodiments, the first and second FIFOs 110, 120 are flushed upon receipt of a global reset event.

Figure 2:
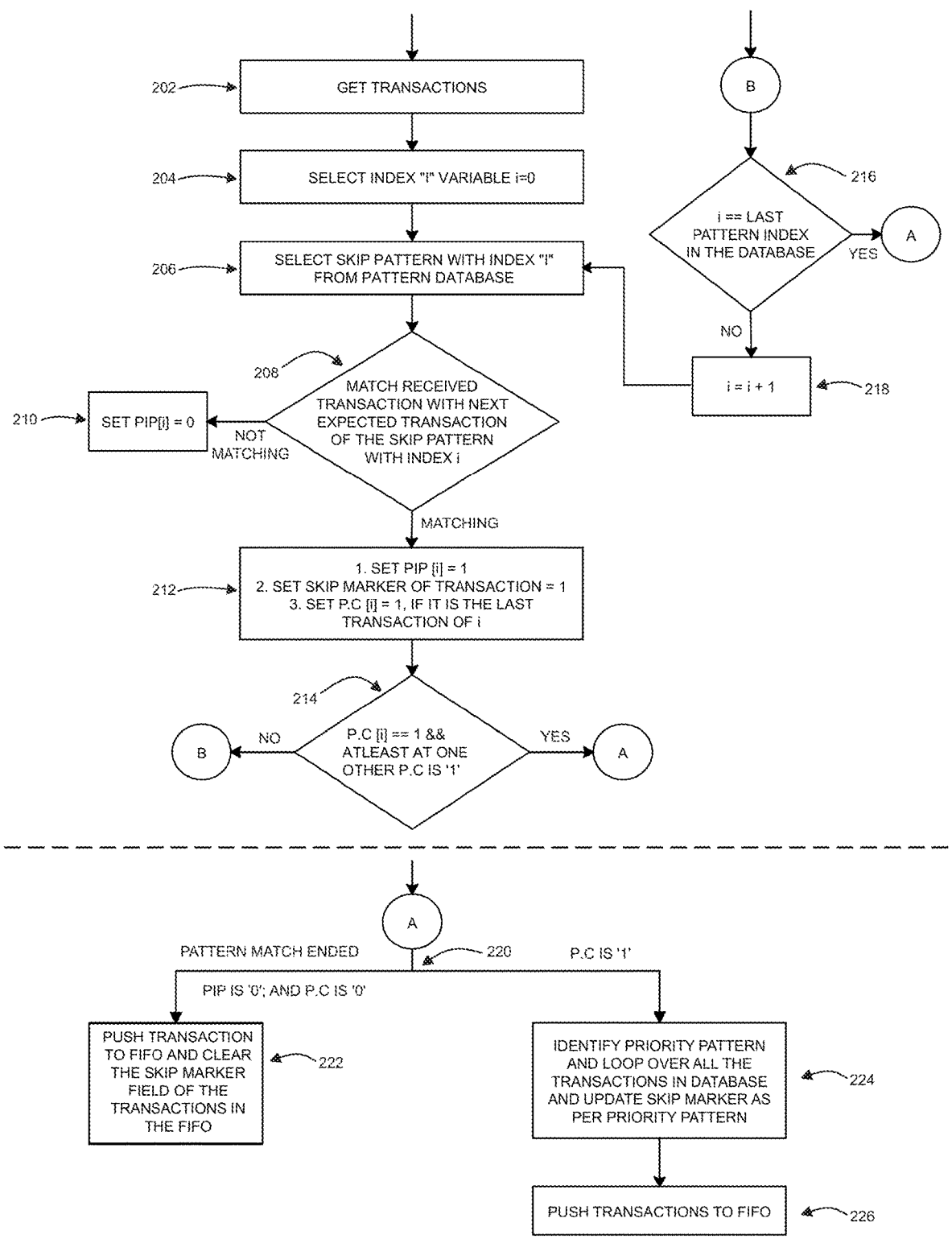
FIG. 2 illustrates a schematic flow diagram depicting operation of first and second pattern detection engines of the system of FIG. 1, according to an embodiment of the present disclosure.

FIG. 2 illustrates a schematic flow diagram depicting operation of the first and second pattern detection engines 108, 118, according to an embodiment of the present disclosure. FIG. 2 represents the operation of any one of the first and second pattern detection engines 108, 118. It may be noted that the other of the first and second pattern detection engines 108, 118 is configured to operate similarly.

At step 202, the transactions are received. At step 204, the pattern detection engine sets pattern loop index variable "i" as 0 which is used to loop through all the skip patterns available in a database, and check if the received transaction matches a next expected transaction in the set of skip patterns at steps 206 and 208 respectively.

At step 208, if the received transaction matches with the first transaction of the selected skip pattern i, the next expected transaction will be updated to a second transaction of the skip pattern. In some embodiments, in a similar manner, if the next received transaction matches with the second transaction of the skip pattern, the next expected transaction will be updated to a third transaction of the skip pattern.

At step 208, if the received transaction does not match with the next expected transaction of the skip pattern, it may be inferred that the selected skip pattern match is broken. In other words, it may be inferred that that the received transaction does not match with the selected skip pattern transaction sequence.

At step 210, if the received transaction does not match the next expected transaction of the skip pattern "i", PIP[i] is set to 0.

At step 212, pattern-in-progress (PIP) flags are maintained. If the received transaction is matching the next expected transaction of the selected skip pattern "i", then PIP[i] is set to 1 and the transaction is labelled as skip marker transaction by setting "skip_marker" field to 1 in the transaction. Further, if the received transaction is the last transaction in the selected skip pattern, then "pattern complete" PC [i] is set to 1 else to 0.

At step 214, if PC [i] is 1 and at least one other index PC is 1, then at step 224, priority pattern is identified out of all the patterns whose PC is set to 1. Further, all the transactions are looped over in the FIFO and the skip marker field is updated as per the priority pattern. Further, at step 226, the updated transactions are pushed to the respective FIFO.

At step 216, if the index variable "i" is not equal to the index of the last skip pattern in the pattern database, at step 218, the index is incremented by 1. The process further proceeds with the pattern matching (to step 206).

At step 220, if pattern matching has ended, i.e., if PIP is 0 and PC is 0 for all the patterns in the database, the transaction is pushed to the respective FIFO. Further, all the transactions are looped over in the FIFO and clear skip marker field of the transactions and the transactions are pushed back into the respective FIFO.

Figure 3:
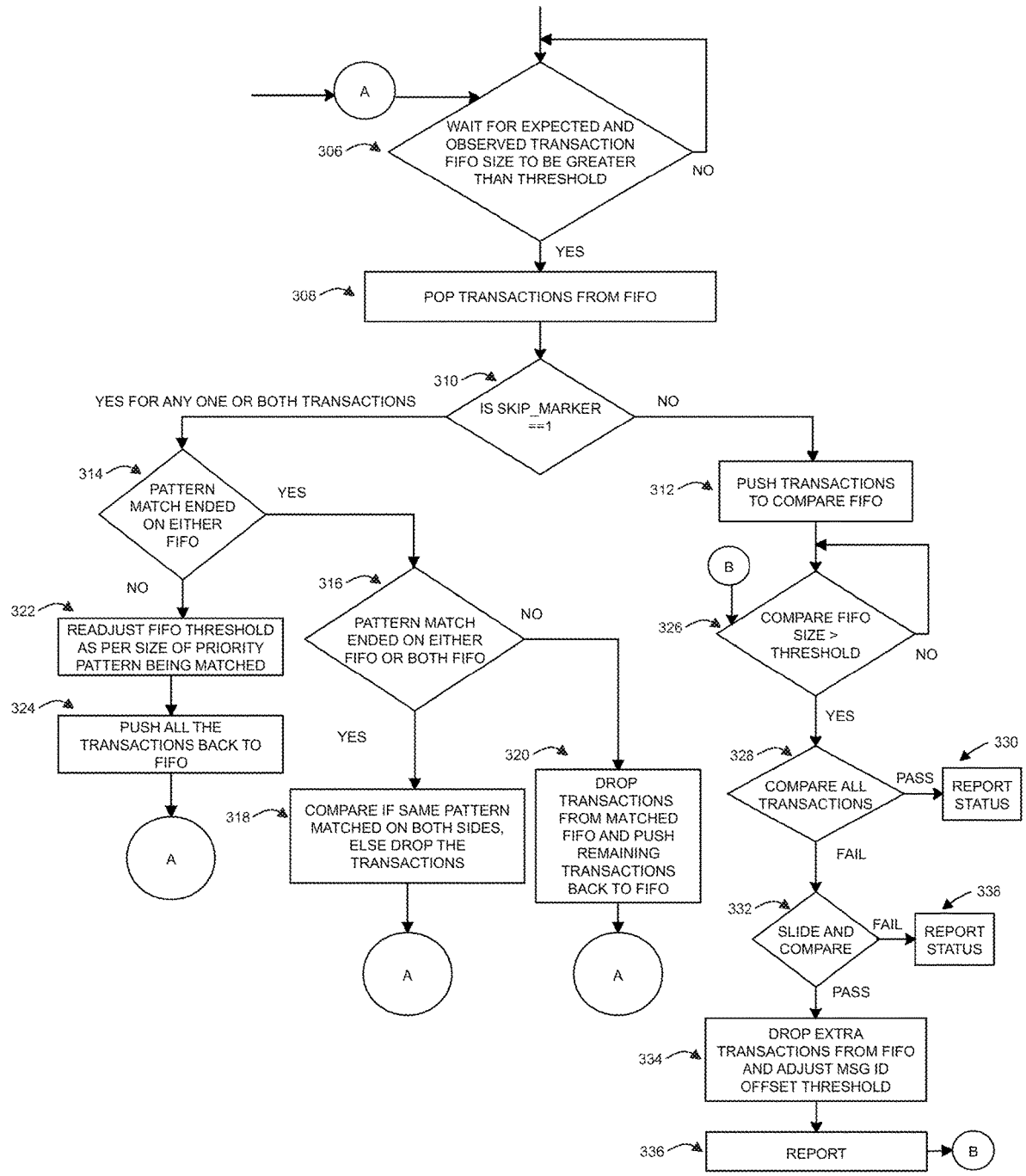
FIG. 3 illustrates a schematic flow diagram depicting operation of a comparison block of the system of FIG. 1, according to an embodiment of the present disclosure.

FIG. 3 illustrates a schematic flow diagram depicting operation of the comparison block 130, according to an embodiment of the present disclosure. The system 100 includes only one comparison block 130. The comparison block 130 monitors both the first and second FIFOs 110, 120 for the transactions and compares the transactions.

At step 306, once FIFO size exceeds FIFO threshold size on both sides, at step 308, the transactions are popped from the FIFO and it is checked if skip_marker field is set.

At step 310, if skip_marker field is not set for the transactions in first and second the FIFOs, then at step 312, the transactions from both the first and second FIFOs are pushed to compare FIFOs for comparison.

At step 310, if the skip_marker field is set for any of the FIFO transactions, at step 314, the comparison block checks if pattern matching ended on either of the first and second FIFOs. If yes, at step 316, the comparison block checks if pattern matching ended on both of the first and second FIFOs. If yes, at step 318, the comparison block compares the transactions if same pattern is matched on both the sides else it drops the skip marker transactions from the FIFOs independently. If no, at step 320, all transactions are dropped from the matched FIFO and all the transactions are pushed back to FIFO.

At step 314, if pattern matching did not end for any of the FIFOs, then, at step 322, FIFO threshold size is updated as per the ongoing priority pattern match and, at step 324, all the transactions are pushed into the respective FIFOs and keeps waiting for FIFO size to be greater than threshold.

At step 326, once the compare FIFOs size is greater than the compare threshold, at step 328, the comparison block pops the transactions from the compare FIFOs and compares the expected transactions with observed transactions.

At step 330, if both the observed and expected transactions match, then status is reported.

At step 328, if both are not matching, then, at step 332, slide and compare mechanism is followed, where FIFOs are slid and then compared to observe the extra transactions in any of them. Extra transaction count should typically be <Nskew.

At step 330, if transaction matches during slide and compare, then, at step 334, next transactions are also compared and if at least Nmin transactions matches after the extra transactions, then extra transactions are removed from the FIFO and, at step 336, reported to the user.

At step 332, if Nmin transactions are not matching, then extra transactions are not removed, and, at step 338 all the mismatches are reported as errors. The compare FIFO threshold may be at least greater than a sum of Nskew and Nmin.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of Invention

The present invention provides a system for identifying and ignoring valid redundant transactions sent from DUT and reference model either due to time skew between them or redundant implementations in them.

The present invention provides a system where a set of valid redundant transactions that can be skipped from comparison is configurable.

The present invention provides a system where events and timestamps of the corresponding skip patterns with respect to which skip patterns can be identified and ignored from comparison are configurable.

The present invention provides a system where skip pattern counts, which specify a number of times a skip pattern can be ignored from comparison after the occurrence of the corresponding event/timestamp is configurable.

The present invention provides a system that adjusts in real-time by identifying one or more additional error data packets occurring on either or both of the DUT and the reference model by performing a slide and compare, and removing the identified additional error data packets from the comparison.

We claim:

1. A system comprising:
a scoreboard operatively coupled to a processor, for testing and verification of serial protocol systems, that causes the scoreboard to:
receive, through a first port, actual data packets from a design under test (DUT), and, through a first pattern detection engine, based on a set of pre-defined skip patterns, identify a first set of redundant data packets from the received actual data packets;
receive, through a second port, reference data packets from a reference model, and, through a second pattern detection engine, based on the set of pre-defined skip patterns, identify a second set of redundant data packets from the received reference data packets; and
compare the received actual data packets and received reference data packets to verify functionality of the DUT by at least one of ignoring the first and second sets of redundant data packets or comparing the first and second sets of redundant data packets if they are matching.

2. The system of claim 1, wherein the first and second sets of redundant data packets are transmitted owing to any one or a combination of time skew between operations of the DUT and the reference model, and redundant functionality implemented in the DUT and the reference model.

3. The system of claim 1, wherein the first and second sets of redundant data packets are identified based on a specified event, specified timestamp, and corresponding pre-defined skip patterns from the set of pre-defined skip patterns.

4. The system of claim 3, wherein the scoreboard ignores the first and second sets of redundant data packets from a comparison for a specified skip pattern count after occurrence of the specified event and/or timestamp.

5. The system of claim 1, wherein one or more pre-defined skip patterns from the set of pre-defined skip patterns are associated with a wait event after which a corresponding skip pattern from the set of pre-defined skip patterns is skipped from the comparison.

6. The system of claim 1, wherein the one or more predefined skip patterns from the set of pre-defined skip patterns are associated with a time during which the respective one or more pre-defined skip pattern is skipped from the comparison after occurrence of the wait event.

7. The system of claim 1, wherein the pre-defined skip patterns are a sequence of data packets/transactions arranged in a defined order.

8. The system of claim 1, wherein the set of pre-defined skip patterns are prioritized in a manner such that a highest priority skip pattern that matches the received data packets is set as a priority pattern.

9. The system of claim 1, wherein the first and second pattern detection engines are same.

10. The system of claim 1, wherein the actual data packets and the reference data packets are positioned respectively in first and second first-in-first-out (FIFOs), wherein the first and second sets of redundant data packets are labelled by the respective first and second pattern detection engines such that the labelled data packets are any one of compared, ignored, and kept on hold during the comparison, and wherein the labelled data packets are any one of compared, ignored, and kept on hold during the comparison until pattern matching is completed in the first and second pattern detection engines.

11. The system of claim 10, wherein the first and second sets of redundant data packets are labelled with a skip marker field.

12. The system of claim 10, wherein the comparison between the received actual data packets and the received reference data packets is undertaken when the corresponding first and second FIFOs reach a minimum threshold size, said minimum threshold size being dynamically controlled based on lengths of skip patterns being matched with the received actual data packets and the received reference data packets at the first and second ports respectively, and priority associated therewith.

13. The system of claim 10, wherein comparison between the received actual data packets and the received reference data packets is undertaken using comparison FIFOs that don't include the first and second sets of redundant data packets.

14. The system of claim 10, wherein transaction ID of any one or both of the received actual data packets and the received reference data packets are adjusted based on a number of respective first and second sets of redundant data packets ignored from the comparison.

15. The system of claim 10, wherein the first and second FIFOs are flushed upon receipt of a global reset event.

16. The system of claim 1, wherein the scoreboard self-adjusts by, in real-time, during the comparison between the received actual data packets and received reference data packets, identifying one or more additional error data packets occurring on either or both of the DUT and the reference model by performing a slide and compare, and removing the identified additional error data packets from the comparison.

17. The system of claim 1, wherein any or both of the first and second ports are implemented as transaction level modeling (TLM) ports defined in a universal verification methodology (UVM).

\* \* \* \* \*